United States Patent Office 3,536,736
Patented Oct. 27, 1970

3,536,736
12-SUBSTITUTED STEROIDS
Patrick A. Diassi, Westfield, N.J., assignor to E. R. Squibb
& Sons, Inc., New York, N.Y., a corporation of Delaware
No Drawing. Filed Sept. 19, 1966, Ser. No. 580,215
Int. Cl. C07c *169/32*
U.S. Cl. 260—397.45                    8 Claims

ABSTRACT OF THE DISCLOSURE

Disclosed herein are steroids of the pregnane series having hydroxy or acyloxy substituents in the 11, 12 and 17-positions. These compounds are active as progestational agents.

---

This invention relates to new steroid chemical compounds and new intermediates in the preparation thereof. More particularly, the invention relates to new steroids of the formula

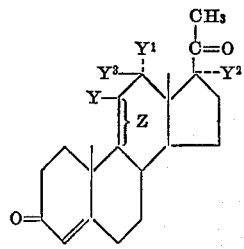

wherein Y, $Y^1$ and $Y^2$ may be the same or different and are selected from the group consisting of hydroxy and acyloxy; $Y^3$ is hydrogen and $Y^1$ and $Y^3$ together are oxo (O=); and Z is a single or double bond between $C_9$ and $C_{11}$.

The preferred acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., phenylacetic and β-phenylpropionic acid), the cycloalkane carboxylic acids and the cycloalkene carboxylic acids.

The final products of the invention are physilogically active compounds which possess progestational activity and thus can be employed instead of progesterone, for example, in the treatment of habitual abortion for which purpose they can be administered in the same manner as progesterone, the dosage being adjusted for the relative potency of the particular steroid. The final products of the invention also possess corticoid activity and can be so utilized.

The final products of the invention are prepared by utilizing 5β-intermediates having the formula

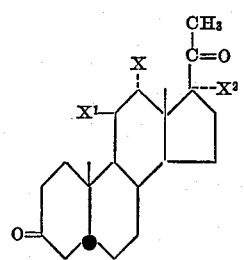

wherein X is halo (preferably chloro or bromo) or hydroxy; $X^1$ is hydroxy; and $X^2$ is acyloxy. The final products of the invention may be prepared according to the following equation:

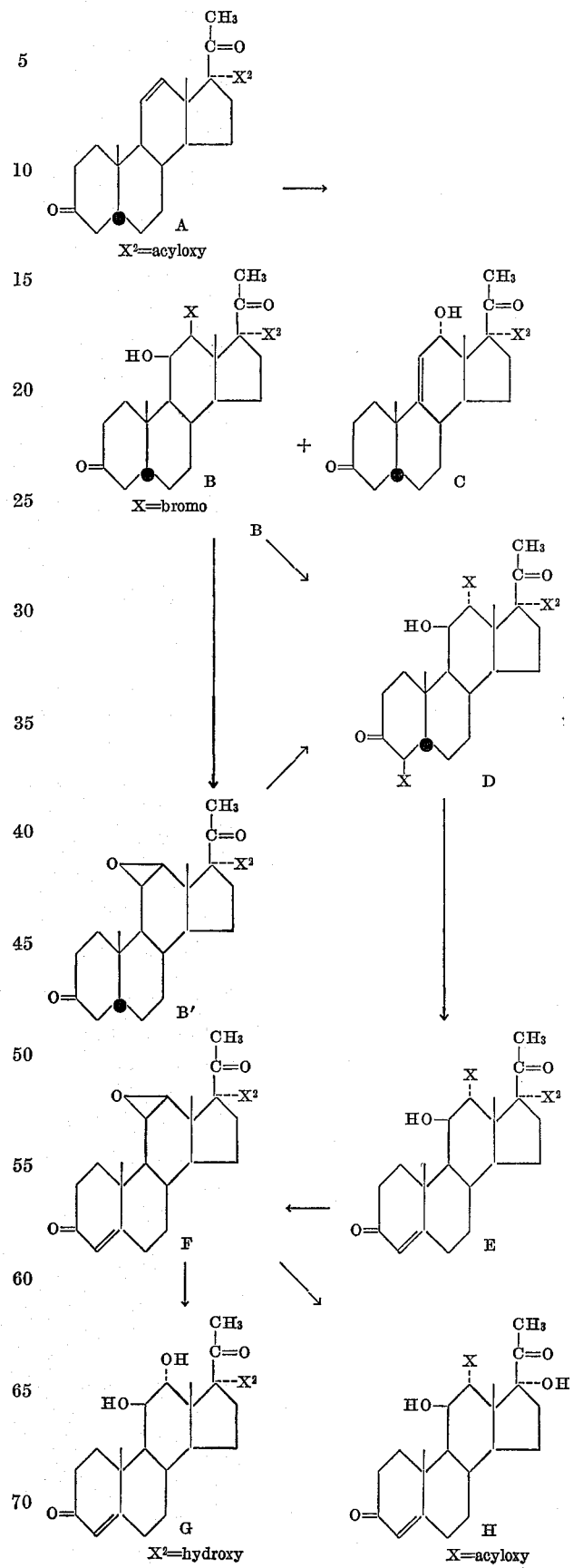

The process of this invention begins by converting the starting material, a 17α-acyloxy-5β-pregn-11-ene-3,20-dione, by utilizing a hydrohalic acid such as an N-bromoamide (including imides), for example, N-bromoacetamide or N-bromosuccinimide in the presence of an acid such as perchloric acid, p-toluenesulfonic acid or trichloroacetic acid to yield the 11β-hydroxy-12α-bromo compounds of the general Formula B and the 9(11)-dehydro-12α-hydroxy derivatives, Compound C. Direct bromination of Compound B gives the 4β,12α-dibromo Compound D which on dehydrohalogenation by reacting with lithium bromide or lithium chloride in dimethylformamide at elevated temperatures leads to the 4-dehydro Compound E.

Alternatively, Compound D may be prepared by first forming the novel 11β,12β-oxide-17α-acyloxy-5β-pregna-3,20-dione (Compound B'). This is accomplished by treating Compound B with potassium carbonate. Compound B' may then be halogenated as above to yield Compound D.

Reacting Compound E with potassium carbonate leads to the 11β,12β-epoxides of general Formula F.

Compound F, when treated with a hydrogen chloride-chloroform solution, yields the corresponding 11β,12α,17α-trihydroxy final products of the invention (Compound G) whereas if Compound F is treated with hydrogen fluoride the corresponding 11β,17α-diol-12α-acyloxy compounds (Compound H) are recovered.

The 9(11)-dehydro derivative, Compound C, can be brominated to form the 4-bromo-12-hydroxy derivative of Compound C which is then dehydrohalogenated in a manner described for the preparation of Compound E. Compound C may be oxidized with chromic acid to yield an 11-keto-9(11)-dehydro end product.

The starting material of the invention is prepared by reacting 3,3-dimethoxy-5β-pregn-11-en-20-one with potassium t-butoxide and oxygen in an organic solvent such as t-butanol. From this reaction mixture are recovered 17α-hydroxy-5β-pregn-11-ene-3,20-dione and the new products, 3,3-dimethoxy-17-hydroxy-5β-pregn-11-en-20-one and 17β-hydroxy-5β,17α-pregn-11-ene-3,20-dione. The 17α-hydroxy-5β-pregn-11-ene-3,20-dione is acylated in a known manner as by treatment with an acidic anhydride in the presence of an organic acid such p-toluenesulfonic acid to yield the starting material of this invention (Compound A).

The invention may be further illustrated by the following examples:

EXAMPLE 1

3,3-dimethoxy-17α-hydroxy-5β-pregn-11-en-20-one; 17α-hydroxy-5β-pregn-11-ene-3,20-dione and 17β-hydroxy-5β,17α-pregn-11-ene-3,20-dione To a solution of 10.0 g. of 3,3-dimethoxy-5β-pregn-11-en-20-one in 124 ml. of benzene is added 139 ml. of 1N potassium t-butoxide in t-butanol and the mixture cooled to about −7° C. A gas measuring burette is attached, the system evacuated, and the mixture stirred under an atmosphere of oxygen. After seven hours the oxygen uptake ceases (≈750 ml. absorbed). The reaction mixture is brought to room temperature and 140 ml. of acetic acid followed by 20 g. of zinc dust are added. After stirring for ninety minutes the zinc is filtered and washed with t-butanol. The filtrate is evaporated under reduced pressure to a volume of approximately fifty milliliters and then carefully diluted with water whereupon crystals separate. The crystals are filtered washed with water and dried to give 7.5 g. of 17α-hydroxy-5β-pregn-11-ene-3,20-dione having a melting point about 200–202° C.

From the filtrate, on standing, a second crop of crystals is obtained. The crystals are filtered and recrystallized several times from acetone-hexane to give 300 mg. of 17β-hydroxy-5β,17α-pregn-11-ene-3,20-dione having a melting point about 163–175° C., $[\alpha]_D^{22}$ +4.1° (chloroform)

$\lambda_{max.}^{CHCl_3}$ 3603, 3450, 1706 cm.$^{-1}$, $\lambda_{max.}^{nujol}$ 2.96, 5.96, 5.92 μ, $\tau_{CDCl_3}^{Si(CH_3)_4}$ 4.20(d, d, 2, 9.5 cps., 11–H), 4.40(d, 9.5 cps., 12–H), 7.73(s, 21–CH$_3$), 8.98(s, 18–CH$_3$), 9.02(s, 19–CH$_3$)

*Analysis.*—Calc'd for C$_{21}$H$_{30}$O$_3$ (330.45) (percent): C, 76.32; H, 9.15. Found (percent): C, 76.32; H, 9.31.

The mother liquor is evaporated under reduced pressure and the residue plate chromatographed on Woelm neutral alumina (Activity V) using chloroform as the developing solvent. The band at Rf 0.5 detectable by iodine vapor is eluted with ethyl acetate, evaporated and crystallized from methanol to give 412 mg. of 3,3-dimethoxy-17α-hydroxy-5β-pregn-11-en-20-one having a melting point about 152–154° C., $[\alpha]_D^{22}$ +18.9°

$\lambda_{max.}^{CDCl_3}$ 3625, 1710 cm.$^{-1}$, $\tau_{CDCl_3}^{Si(CH_3)_4}$ 4.24(br, 11–H and 12–H), 6.81(s, 3–OCH$_3$), 6.86(s, 3–OCH$_3$), 9.10(s, 19–CH$_3$), 9.26(s, 18–CH$_3$), 7.71(s, 21–CH$_3$)

*Analysis.*—Calc'd for C$_{23}$H$_{34}$O$_4$ (374.50) (percent): C, 73.76; H, 9.15. Found (percent): C, 73.93; H, 9.43.

EXAMPLE 2

12α-bromo-11β,17α-dihydroxy-5β-pregna-3,20-dione 17-acetate and 12α,17α-dihydroxy-5B-pregn-9(11)-ene-3,20-dione To a solution of 5.78 g. of 17α-acetoxy-5β-pregn-11-ene-3,20-dione in 173 ml. of dioxane is added 2.47 g. of N-bromo-acetamide followed by 98.3 ml. of 0.167 N perchloric acid. The reaction mixture is kept in the dark at room temperature for ninety minutes then diluted with water and extracted with chloroform. The chloroform is washed with water and evaporated under reduced pressure. The residue is treated with acetone and the crystals which separate are filtered and washed with acetonehexane to give 1.07 g. of 12α-bromo-11β,17α-dihydroxy-5β-pregn-3,20-dione 17-acetate having a melting point about 215–217° C., $[\alpha]_D^{22}$+28° (chloroform)

$\lambda_{max.}^{nujol}$ 2.81, 5.77, 5.83 μ, $\tau_{CDCl_3}^{Si(CH_3)_4}$ 5.50(m, 11α–H), 5.77(d, 2 cps., 12β–H), 7.82(s, 21–CH$_3$), 7.90(s, 17–OAc), 8.77(s, 19–CH$_3$), 8.92(s, 18–CH$_3$)

*Analysis.*—Calc'd for C$_{23}$H$_{33}$O$_5$ Br (469.43) (percent): C, 58.85; H, 7.09; Br, 17.03. Found (percent): C, 58.94; H, 6.79; Br, 17.24.

The mother liquid is evaporated and plate chromatographed on silica gel HF using ethyl acetate-chloroform (1:4, v.v) as the developing solvent. Three bands could be detected by iodine vapor at Rf 0.7, 0.4 and 0.3, respectively. The least polar band on elution and crystallization gives 79 mg. of starting material. The band at Rf=0.4 gives 76 mg. of 12α-bromo-11β, 17α-dihydroxy-5β-pregna-3,20-dione 17-acetate and the most polar band gives 294 mg. of 12α,17α-dihydroxy-5β-pregn-9(11)-ene-3,20-dione having a melting point about 222–225° C., $[\alpha]_D^{22}$ −128° (chloroform)

$\lambda_{max.}^{nujol}$ 2.80, 5.79, 8.04μ, $\tau_{CDCl_3}^{Si(CH_3)_4}$ 4.57(s, 11–H), 5.04 (br, 12β–H), 7.63 (s, 21–CH$_3$), 7.91 (s, 17–OAc), 8.82 (s, 18–CH$_3$) 9.31 (s, 19–CH$_3$).

*Analysis.*—Calc'd for C$_{23}$H$_{32}$O$_5$(388.49) (percent): C, 71.10; H, 8.30. Found (percent): C, 71.01; H, 8.23.

EXAMPLE 3

11β,12β-oxido-17α-acetoxy-5β-pregna-3,20-dione

To a suspension of 100 mg. of 12α-bromo-11β,17α-dihydroxy-5β-pregna-3,20-dione 17-acetate in 15 ml. of methanol is added 1.5 ml. of 10% potassium carbonate and the mixture stirred at room temperature for ten minutes. It is then neutralized with 10% acetic acid, diluted with water and extracted with chloroform. The chloroform is evaporated to dryness and the residue crystillized from acetone-hexane to give 11β,12β-oxido-17α-acetoxy-5β-pregna-3,20-dione having a melting point about 213–215° C.

EXAMPLE 4

12α-bromo-11β,17α-dihydroxyprogesterone 17-acetate

To a solution of 1.93 g. of 12α-bromo-11β,17α-dihydroxy-5β-pregna-3,20-dione 17-acetate in 20 ml. of chloroform and 20 ml. of methylene dichloride cooled to 0° C. a 6.0 ml. of a solution containing 110 mg. of bromine and 370 mg. of sodium acetate per milliliter of acetic acid are added dropwise with stirring. The solution is diluted with water and extracted with chloroform. The chloroform is washed well with water, dried over magnesium sulfate and evaporated under reduced pressure. The residue is dissolved in 100 ml. of dimethylformamide, 10 g. of lithium bromide are added and the mixture heated, under nitrogen, on a steam bath for four hours. After cooling it is diluted with water and extracted with chloroform. The chloroform is washed with water and evaporated under reduced pressure. Crystallization of the residue from acetonehexane gives 1.60 g. of 12α-bromo-11β,17α-dihydroxyprogesterone 17-acetate having a melting point about 202–204° C., $[\alpha]_D^{22}+53°$ (chloroform), $\lambda_{max.}^{alc}$ 239 mμ ε, 14000), $\lambda_{max.}^{nujol}$ 2.97, 5.74, 5.82, 6.01, 6.14μ, $\tau_{CDCl_3}^{Si(CH_3)_4}$ 4.28 (s, 4–H), 5.43 (m, 11α–H), 5.74 (d, 2.5 cps, 12β–H), 7.82 (s, 21–CH$_3$), 7.90 (s, 17–OAc), 8.57 (s, 19–CH$_3$), 8.88 (s, 18–CH$_3$).

Analysis.—Calc'd for C$_{23}$H$_{31}$O$_5$Br (467.38) (percent): C, 59.10; H, 6.69; Br, 17.10. Found (percent): C, 59.08; H, 6.90; Br, 17.56.

EXAMPLE 5

11β,12β-oxido-17α-hydroxyprogesterone 17-acetate

To a solution of 2.7 g. of 12α-bromo-11β,17α-dihydroxy-progesterone 17-acetate in 200 ml. of methanol are added 20 ml. of 10% potassium carbonate and the mixture kept at room temperature for forty-five minutes. The solution is then neutralized with 10% acetic acid and the methanol removed under reduced pressure. The residue is distributed between chloroform and water. The chloroform phase is separated, washed well with water and evaporated. Crystallization of the residue from methanol gives 493 mg. of 11β,12β-oxido-17α-hydroxyprogesterone 17-acetate having a melting point about 230–232°, $[\alpha]_D^{25}+97°$ (chloroform), $\lambda_{max.}^{alc}$ 238 mμ (ε, 163000), $\lambda_{max.}^{nujol}$ 5.78, 5.82, 5.99, 614μ, $\tau_{CDCl_3}^{Si(CH_3)_4}$ 4.24 (s, 4–H), 6.50 (d, 4 cps, 11α–H), 6.76 (m, 12α–H), 7.78 (s, 21–CH$_3$), 7.89 (s, 17–OAc), 8.63 (s, 19–CH$_3$), 9.24 (s, 18–CH$_3$)

Analysis.—Calc'd for C$_{23}$H$_{30}$O$_5$ (386.47) (percent): C, 71.48; H, 7.82. Found (percent) C, 71.71; H, 7.95.

The mother liquor is plate chromatographed on silica gel HF using ethyl acetate-chloroform (1:3, v.v) as the developing solvent. Elution followed by crystallization of the U.V. detectable band at Rf≈0.5 gives an additional 306 mg. of 11β,12β-oxido-17α-hydroxyprogesterone 17-acetate. Elution of the U.V. detectable band at Rf≈0.3 gives on crystallization 135 mg. of 11β,12β-oxido-17α-hydroxyprogesterone having a melting point about 253–255°, $[\alpha]_D^{22}+134°$ (chloroform)

$\lambda_{max.}^{alc}$ 239 mμ (ε, 16200), $\lambda_{max.}^{nujol}$ 2.87, 5.85, 6.00, 6.18μ, $\tau_{CCCl_3}^{Si(CH_3)_4}$ 4.27 (s, 4–H), 6.76 (br, 11α–H, 12α–H), 6.52 (br, 17–OH), 7.61 (s, 21–CH$_3$), 8.64 (s, 19–CH$_3$), 9.16 (s, 18–CH$_3$).

Analysis.—Calc'd for C$_{21}$H$_{28}$O$_4$ (344.44) (percent): C, 73.22; H, 8.19. Found (percent): C, 73.19; H, 8.29.

EXAMPLE 6

11β,12α,17α-trihydroxyprogesterone

To a solution of 193 mg. of 11β,12β-oxido-17α-hydroxy-progesterone 17-acetate in 10 ml. of chloroform cooled to 0° C. are added dropwise over a five-minute-period 8.3 ml. of 0.42 N hydrogen chloride in chloroform. After one hour the solution is washed several times with water and evaporated to dryness under reduced pressure. The residue is plate chromatographed on silica gel HF using ethyl acetate-chloroform (1:4, v.v) as the developing solvent. Elution of the band followed by evaporation and crystallization gives 81 mg. of 11β,12α,17α-trihydroxyprogesterone having a melting point about 250–252°, $[\alpha]_D^{25}+151°$ (95% ethanol)

$\lambda_{max.}^{alc}$ 240 mμ (ε,13550), $\lambda_{max.}^{CDCl_3}$ 3600, 3435, 1711, 1661, 1600 cm.$^{-1}$, $\lambda_{max.}^{nujol}$ 2.90–3.00, 5.84, 6.02, 6.18μ, $\tau_{CDCl_3}^{Si(CH_3)_4}$ 7.69 (s, 21–CH$_3$), 8.56 (s, 19–CH$_3$), 9.09 (s, 18–CH$_3$).

Analysis.—Calc'd for C$_{21}$H$_{30}$O$_5$ (362.45) (percent): C, 69.58; H, 8.34. Found (percent): C, 68.70; H, 8.23.

EXAMPLE 7

11β,12α,17α-trihydroxyprogesterone 12α-acetate (a) From 11β,12β-oxido-17α-hydroxyprogesterone -17 acetate.—To a solution of 100 mg. of 11β,12β-oxido-17α-hydroxyprogesterone 17-acetate in 5 ml. of chloroform and 1.0 ml. of tetrahydrofuran contained in a polyethylene bottle and cooled to −60° C. are added 1.1 ml. of hydrogen fluoride. The mixture is then stirred at 0° C. for twenty hours then poured into a mixture of 50 ml. of chloroform and 20 ml. of water contained in a polyethylene beaker. The solution is neutralized with sodium bicarbonate the chloroform is washed with water and evaporated under reduced pressure. Plate chromatography of the residue on silica gel HF using ethyl acetate-chloroform (1:1, v.v) as the developing solvent gives a band at Rf≈0.2 which on elution with methanol-ethyl acetate (1:3, v.v) followed by evaporation and crystallization from acetone-hexane gives 14 mg. of 11β,12α,17α-trihydroxyprogesterone 12α-acetate having a melting point about 196–198°, $[\alpha]_D^{25}+139°$ (95% ethanol), $\lambda_{max.}^{alc}$ 240 mμ (ε, 17600), $\lambda_{max.}^{CDCl_3}$ 3594, 3547, 1750, 1708, 1664 cm.$^{-1}$, $\lambda_{max.}^{nujol}$ 2.86, 2.92, 5.76, 5.90, 6.03, 6.12μ, $\tau_{CDCl_3}^{Si(CH_3)_4}$ 4.31 (s, 4–H), 4.85 (d, 2.3 cps., 12β–H), 5.92 (m, 11α–H), 6.16 (s, 17–OH), 7.88 (s, 21–CH$_3$), 8.55 (s, 19–CH$_3$), 8.97 (s, 18–CH$_3$).

Analysis.—Calc'd for C$_{23}$H$_{32}$O$_6$ (404.49) (percent): C, 68.29; H, 7.97. Found (percent): C, 68.45; H, 8.17.

(b) From 11β,12α,17α-trihydroxyprogesterone. — A solution of 30 mg. of 11β,12α,17α-trihydroxyprogesterone in 2 ml. of dry pyridine and 1.0 ml. of acetic anhydride is left at room temperature for sixteen hours then evaporated under reduced pressure. Crystallization of the residue from ethyl acetate-hexane gives 16.6 mg. of 11β,12α, 17α-trihydroxyprogesterone 12-acetate.

EXAMPLE 8

12α,17α-dihydroxypregna-4,9(11)-diene-3,20-dione 17-acetate

Following the procedure of Example 4 but substituting 12α,17α-dihydroxy-5β - pregn-9(11) - ene-3,20-dione 17-acetate for 12α-bromo-11β,17α-dihydroxy-5β-pregna-3, 20-dione 17-acetate there is obtained 12α,17α-dihydroxypregna-4,9(11)-diene-3,20-dione 17-acetate having a melting point about 238–285°, $[\alpha]_D^{25}$ −63° (chloroform), $\lambda_{max.}^{alc}$ 238 m$\mu$ ($\epsilon$, 18300), $\lambda_{max.}^{nujol}$ 2.88, 5.78, 5.82, 6.00, 6.18 $\mu$, $\tau_{CDCl_3}^{Si(CH_3)_4}$ 4.24(s, 4–H), 4.60(s, 11–H), 5.10(m, 12$\beta$–H), 7.63(s, 21–CH$_3$), 7.94(s, 17–OAc), 8.63(s, 19–CH$_3$), 9.27 (s, 18–CH$_3$)

Analysis.—Calc'd for $C_{23}H_{30}O_5$ (386.47) (percent): C, 71.48; H, 7.82. Found (percent): C, 71.45; H, 7.86.

EXAMPLE 9

17$\alpha$-acetoxy-5$\beta$-pregn-9(11)-ene-3,12,20-trione

To a solution of 150 mg. of 12$\alpha$,17$\alpha$-dihydroxy-5$\beta$-pregn-9(11)-ene-3,20-dione 17-acetate in 4.0 ml. of reagent grade acetone are added dropwise 1.5 ml. of a solution containing 20 mg. of chromic anhydride and 32 mg. of sulfuric acid per milliliter of acetone-water (9:1, v.v). After five minutes the mixture is slowly diluted with water and the crystals which separate are filtered washed with water and dried. Recrystallization from acetone-hexane gives 92 mg. of 17$\alpha$-acetoxy-5$\beta$-pregn-9(11)-ene-3,12,20-trione having a melting point about 185–187°, $[\alpha]_D^{25}$ +64° (chloroform), $\lambda_{max.}^{alc}$ 238 m$\mu$ ($\epsilon$, 11500), $\lambda_{max.}^{nujol}$ 5.76, 5.84, 5.97, 6.24, $\mu$, $\tau_{CDCl_3}^{Si(CH_3)_4}$ 4.05(s, 11–H), 7.62(s, 21–CH$_3$), 7.89(s, 17–OAc), 8.73(s, 19–CH$_3$), 9.21(s, 18–CH$_3$)

Analysis.—Calc'd for $C_{23}H_{30}O_5$ (386.47) (percent): C, 71.48; H, 7.82. Found (percent): C, 71.86; H, 7.56.

The invention may be variously otherwise embodied within the scope of the appended claims.

What is claimed is:

1. A compound having the formula:

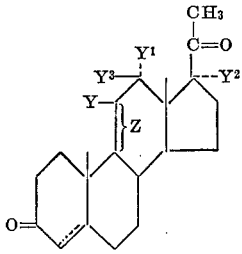

wherein Y, Y$^1$ and Y$^2$ are selected from the group consisting of hydroxy and acyloxy; Y$^3$ is hydrogen and Y$^1$ and Y$^3$ together are oxo (O=); Z is a single or double bond and when Z is a double bond, Y is hydrogen and the 4(5) bond is saturated.

2. A compound having the formula

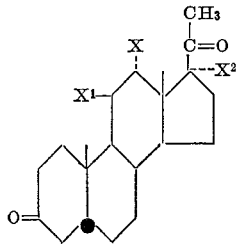

wherein X is selected from the group consisting of halo and hydroxy, X$^1$ is hydroxy and X$^2$ is acyloxy.

3. A compound in accordance with claim 1 having the name 11$\beta$,12$\alpha$,17$\alpha$-trihydroxyprogesterone 12$\alpha$-acetate.

4. A compound in accordance with claim 1 having the name 11$\beta$,12$\alpha$,17$\alpha$-trihydroxyprogesterone.

5. A compound in accordance with claim 2 having the name 12$\alpha$-bromo-11$\beta$,17$\alpha$-dihydroxy-5$\beta$-pregna-3,20-dione 17-acetate.

6. A compound having the formula

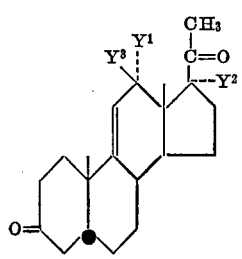

wherein Y$^1$, Y$^2$ and Y$^3$ are as defined in claim 1.

7. A compound in accordance with claim 6 having the name 17$\alpha$-acetoxy-5$\beta$-pregn-9(11)-ene-3,12,20-trione.

8. A compound in accordance with claim 6 having the name 12$\alpha$,17$\alpha$-dihydroxy-5$\beta$-pregn-9(11)-ene-3,20-dione 17-acetate.

References Cited

UNITED STATES PATENTS

| | | | |
|---|---|---|---|
| 3,640,838 | 6/1953 | Wendler et al. | 260—397.4 |
| 2,814,629 | 11/1957 | Fried et al. | 260—397.3 |
| 2,964,450 | 12/1960 | Fried et al. | 195—51 |
| 3,000,911 | 9/1961 | Fried et al. | 260—397.3 |
| 3,069,440 | 12/1962 | Joseph et al. | 260—397.45 |
| 3,185,713 | 5/1965 | Becker et al. | 260—397.3 |

OTHER REFERENCES

Herz et al., Journ. Amer. Chem. Soc., vol. 78, 1956, pp. 2017–18.

Zderic et al., Journ. Amer. Chem. Soc., vol. 82, 1960, pp. 446–451.

Becker et al., Journ. Org. Chem., vol. 30, July 1965, pp. 2169–2175.

LEWIS GOTTS, Primary Examiner

E. G. LOVE, Assistant Examiner

U.S. Cl. X.R.

260—239.55, 999

UNITED STATES PATENT OFFICE
CERTIFICATE OF CORRECTION

Patent No. 3,536,736                                October 27, 1970

Patrick A. Diassi

It is certified that error appears in the above identified patent and that said Letters Patent are hereby corrected as shown below:

Column 1, line 47, "physilogically" should read -- physiologically --. Column 2, lines 15 to 25, equation at the left side should appear as shown below:

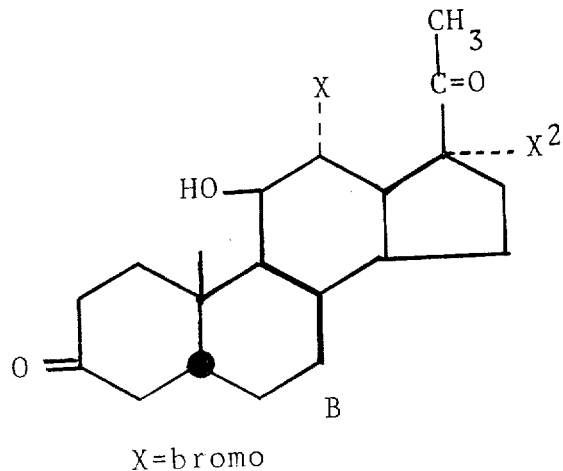

X=bromo

Column 3, line 16, "oxide" should read -- oxido --; line 29, "can be" should read -- can also be --. Column 5, line 54, "(ε, 163000)" should read -- (ε, 16300) --; same line 54, "614μ" should read -- 6.14μ --; line 72, "CCCI$_3$" should read -- CDCl$_3$ --. Column 7, line 2, "238-285°" should read -- 283-285° --.

Signed and sealed this 13th day of July 1971.

(SEAL)
Attest:

EDWARD M. FLETCHER, JR.
Attesting Officer

WILLIAM E. SCHUYLER, JR.
Commissioner of Patents